United States Patent [19]

Kinzler

[11] 4,085,008
[45] Apr. 18, 1978

[54] REVERSING METHOD AND APPARATUS FOR THE AUTOMATIC HEATING CHANGE-OVER OF A COKE OVEN BATTERY

[75] Inventor: Raymond Carl Kinzler, Carnegie, Pa.

[73] Assignee: Koppers Company, Inc., Pittsburgh, Pa.

[21] Appl. No.: 723,461

[22] Filed: Sep. 15, 1976

[51] Int. Cl.² .......................... C10B 1/06; C10B 5/12; C10B 21/16
[52] U.S. Cl. ................................. 202/151; 202/141; 202/142; 202/143; 202/144
[58] Field of Search .............................. 202/141–144, 202/151; 137/309

[56] References Cited

U.S. PATENT DOCUMENTS

| | | | |
|---|---|---|---|
| 1,865,162 | 6/1932 | Becker | 202/142 |
| 1,920,911 | 8/1933 | Olsson et al. | 202/151 |
| 3,054,728 | 9/1962 | Schmidt | 202/151 X |
| 3,344,039 | 9/1967 | Nestler | 202/151 X |
| 3,385,767 | 5/1968 | Van Ackeren | 202/141 |
| 3,433,716 | 3/1969 | Tucker | 202/151 |
| 3,630,222 | 3/1970 | Tucker | 202/143 X |
| 3,751,342 | 8/1973 | Gidick | 202/151 X |
| 3,914,159 | 10/1975 | Gidick | 201/151 X |

*Primary Examiner*—Joseph Scovronek
*Assistant Examiner*—Michael S. Marcus
*Attorney, Agent, or Firm*—R. Lawrence Sahr; Oscar B. Brumback

[57] ABSTRACT

A machine for reversing the heating cycle of a coke oven battery includes mechanism to lock out either one of two reversing rods in proper time sequence so that only three of the normal four reversing rods are operable for the selected mode of underfiring of the battery. Shifting or change over can only be accomplished at the neutral position which occurs when all fuel gas to the battery is shut off. The shifting or change over initiates the change over of rich or lean underfiring gas and also is interlocked so that the main drive cannot operate until all change over functions are completed.

10 Claims, 12 Drawing Figures

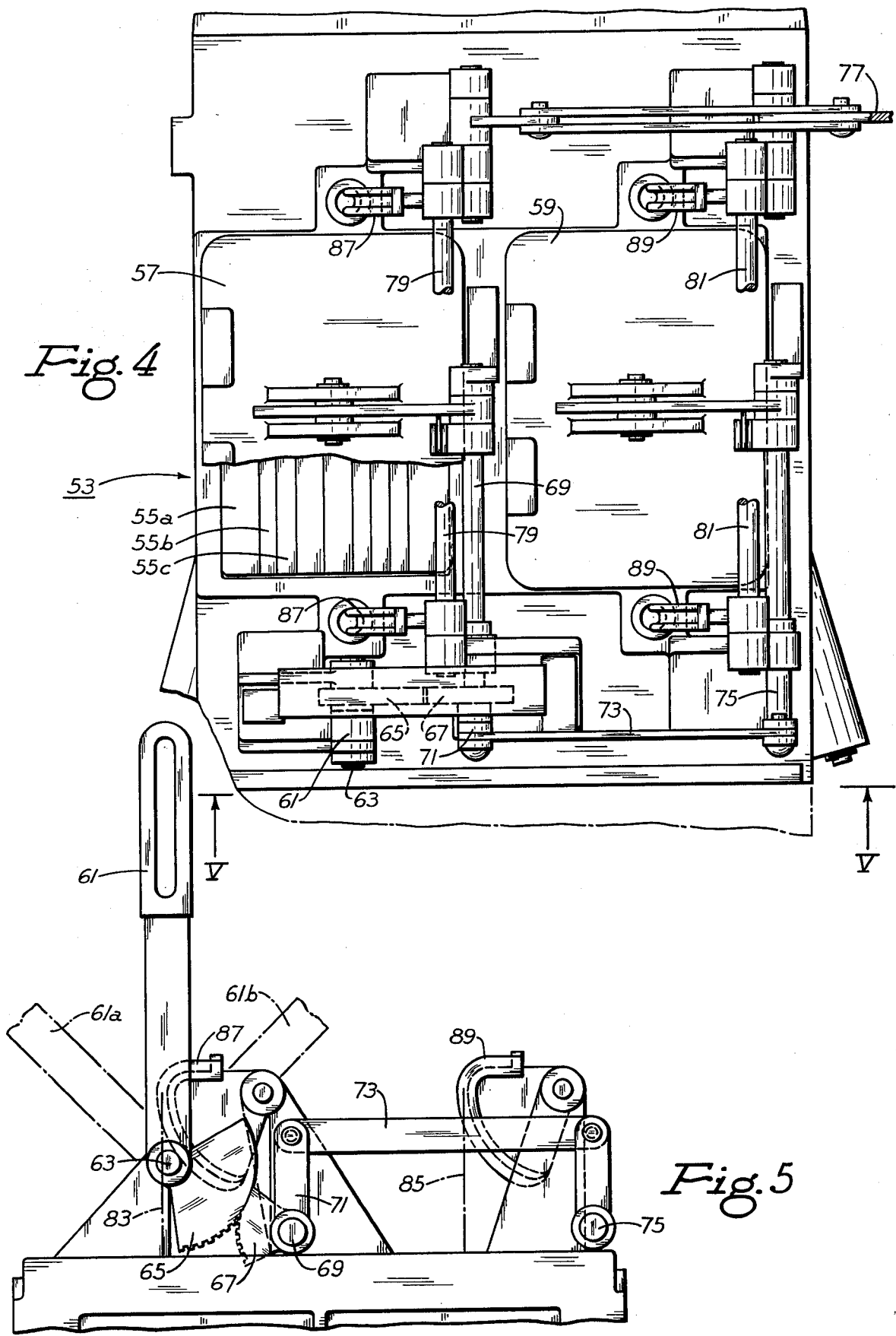

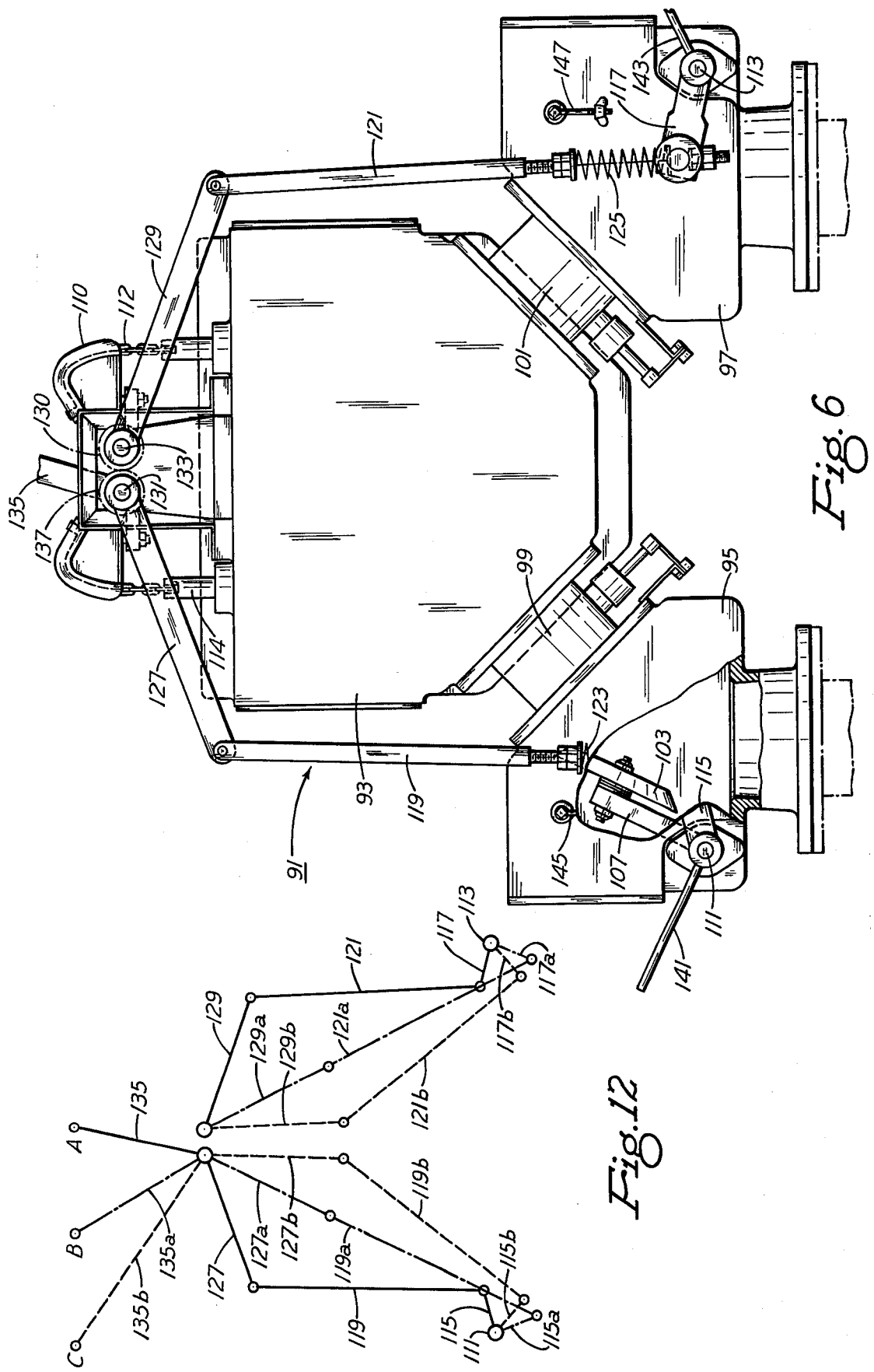

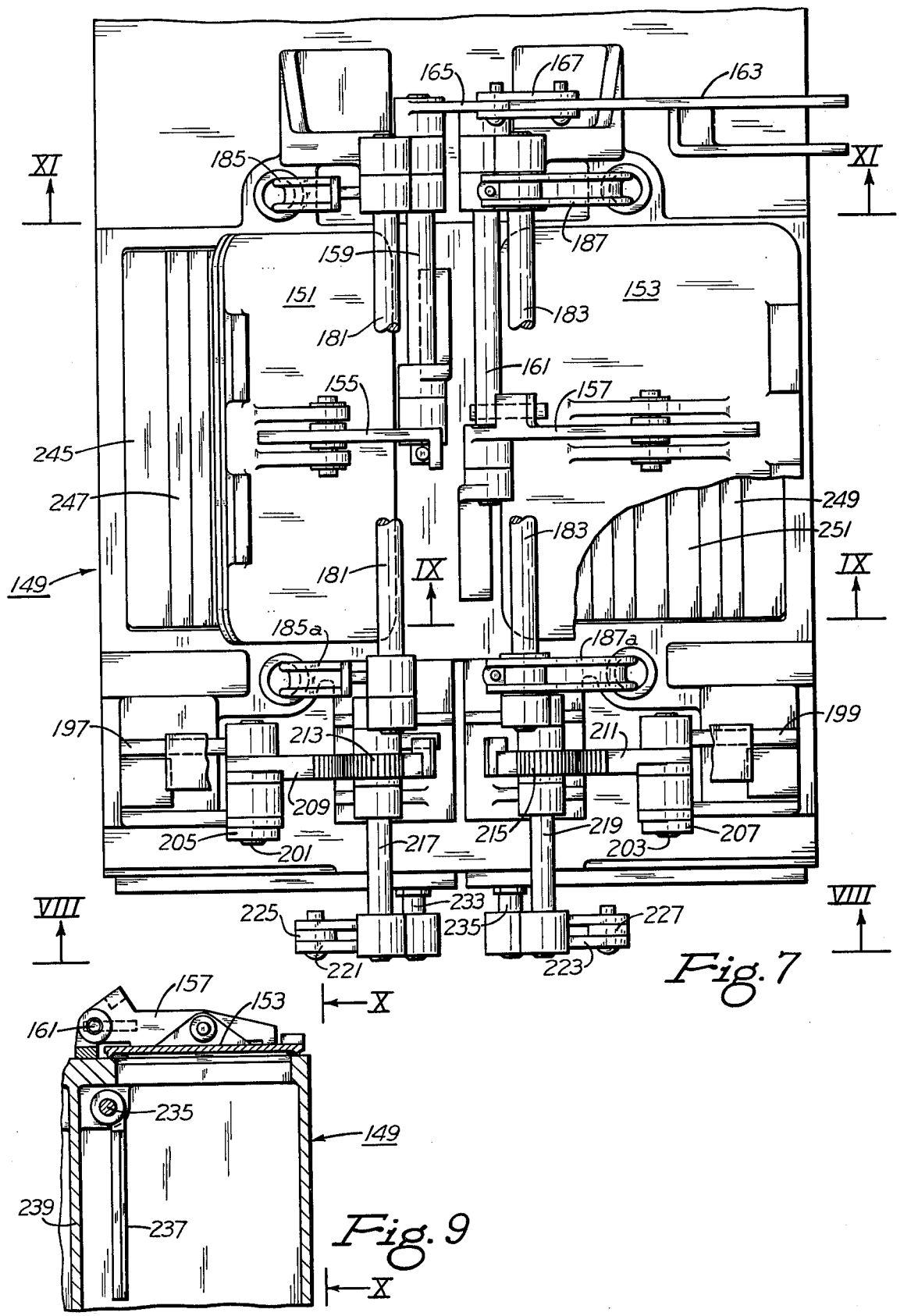

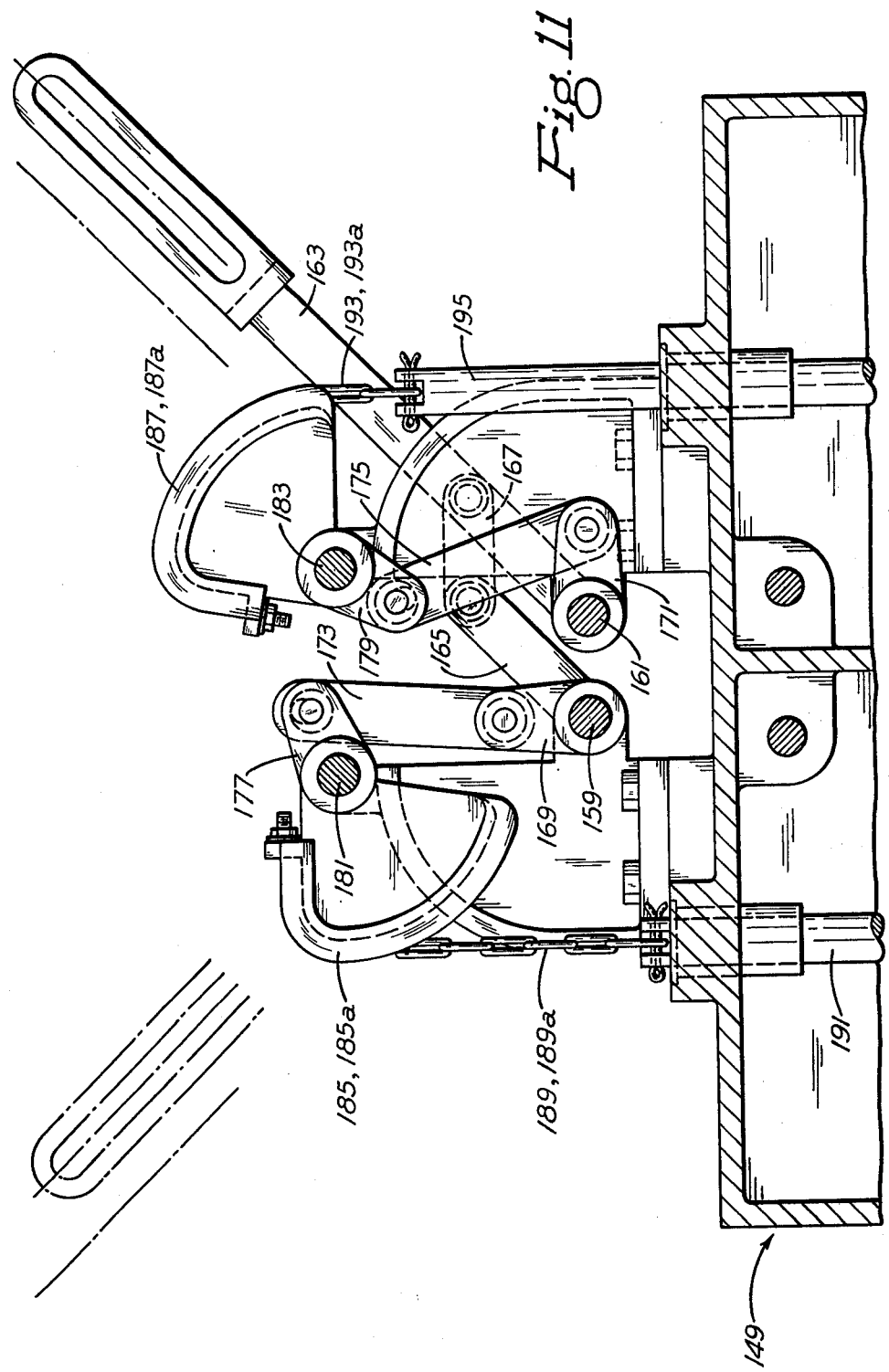

REVERSING METHOD AND APPARATUS FOR THE AUTOMATIC HEATING CHANGE-OVER OF A COKE OVEN BATTERY

BACKGROUND OF THE INVENTION

The present invention relates to a coke oven battery and, more particularly, to a reversing apparatus with an automatic change over feature which is used when firing of the battery is changed from one type of gas to another type of gas. That is, the reversing apparatus of the present invention automatically controls the reversal of the flow of air and waste gas through the vertical flame flues of the heating walls, and controls the flow of fuel gas and combustion air to the flame flues.

Those skilled in the art recognize that the control of the flow of fuel gas and combustion air to two groups of flame flues, and the control of the flow of waste heat from the same two groups of flame flues, increases the number of sequential steps in the proper operation of a coke oven battery. The steps must be timed to occur in a preselected sequence. All of the control components associated with the respective groups of flame flues must be actuated in a matched sequential manner. It is necessary for maximum safety that the actuators be positively interlocked to ensure proper sequential operation.

Additionally, in a coke oven battery operation, it is necessary or desireable from time to time to change over from burning one kind of fuel to another kind of fuel. Heretofore, coke oven batteries have been built in such a way that the flame flues can burn either rich, or coke oven gas, or lean, or blast furnace gas.

In order to change over from burning one type of gas to another type of gas under maximum safe conditions, a prescribed sequence of steps are performed in opening and closing valves that control the flow of rich gas and lean gas. Certain manual operations to accomplish the desired change over have, heretofore, been performed. The present invention, however, performs the required operations automatically and in proper sequence.

A general list of the operations that were formerly done manually are:
1. The air valve lids on all reversing boxes fitted for lean or blast furnace gas would be latched when firing with such lean gas. The same air valve lids would be unlatched when firing with rich or coke oven gas;
2. When firing with lean or blast furnace gas, all of the lean gas shut-off valves would be opened;
3. When firing with rich or coke oven gas, all of the lean gas shut-off valves would be closed; and
4. When firing with lean or blast furnace gas, the air setting of the air valves on all boxes not fitted for blast furnace gas would be changed by removing or adding finger bars therein; finger bars would be removed, thereby increasing the air opening, when firing with lean or blast furnace gas, and finger bars would be added, thereby decreasing the air opening, when firing with rich or coke oven gas.

In coke oven batteries that are fired with mixed gas through the rich gas system simultaneously with lean or blast furnace gas through the sole flues, additional change over steps are required. It should be noted that, when changing from rich gas to lean gas firing, the change over time for these steps is most critical. When changing from rich to mixed gas underfiring, the flow rate of the rich gas must be substantially reduced, and this reduced flow is mixed with lean gas.

On a battery with end flue heating (separate gas flow to the two end flues on each side of the battery) there are a minimum of three valves that must be opened, closed or repositioned.

On change over from mixed gas to rich gas underfiring, these same three valves must be changed over.

Where a battery is fired by burning only lean or blast furnace gas, or by burning only rich or coke oven gas, the number of valves to change is reduced from three to one.

Those skilled in the art will, from the following description of one embodiment of the present invention, understand that it performs all of the normal reversing functional steps and, in addition, performs all of the aforementioned manual change over steps at any reverse neutral position at the discretion of the battery control operator by selecting a control mode on the control panel in the battery reversing room or at some other designated operating station.

SUMMARY OF THE INVENTION

In apparatus for reversing the heating cycle of a coke oven battery, a first reversing machine has an operative fuel gas cam and an operative air and wast-heat cam. Means is provided for rotating the cams about an axis. A second reversing machine has an operative blast furnace gas cam and an air flapper cam. Also, associated with the machines is a clutch means for selectively engaging and disengaging the blast furnace gas cam or the air flapper cam with the cams of the first machine. Means is provided for moving the clutch means into and out of engagement with either the blast furnace gas cam or the air flapper cam, and means is provided for locking either one of the air flapper or blast furnace gas cam in fixed position as the other one cam is driven as the clutch means engages the driven cams of the first machine.

For a further understanding of the invention and for features and advantages thereof, reference may be made to the following description and the drawing which illustrates a preferred embodiment of equipment in accordance with the invention which is suitable for practicing the method of the invention.

BRIEF DESCRIPTION OF THE DRAWINGS

The drawings illustrate one embodiment of the invention wherein:

FIG. 4 is a schematic plan view of a gas or air and waste-heat reversing box in accordance with the invention;

FIG. 5 is a view along line V—V of FIG. 4;

FIG. 6 is a front elevational view of a double blast furnace gas reversing box;

FIG. 7 is a plan view of an air and waste-heat reversing box assembly;

FIG. 9 is a view along line IX—IX of FIG. 7, showing a portion of the interior of the structure of FIG. 7;

FIG. 11 is a view along line XI—XI of FIG. 7; and

FIG. 12 is a typical reversing lever and blast furnace gas shut-off valve lever diagram.

DETAILED DESCRIPTION

Figure 1:
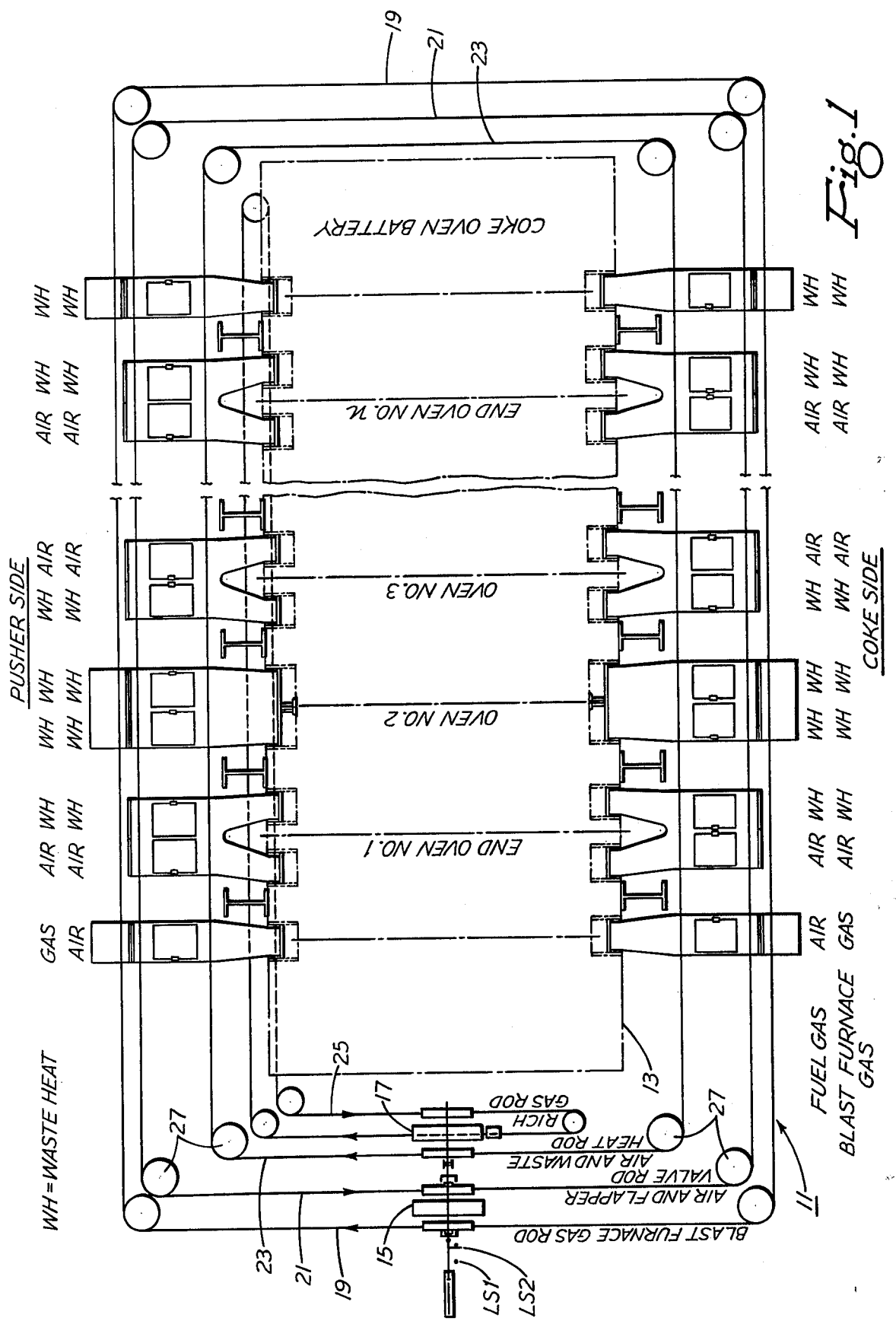
FIG. 1 is a schematic plan view of a reversing system for a coke oven battery in accordance with the invention.

Referring to FIG. 1, a schematic arrangement of a reversing system 11 of a coke oven battery 13 is shown. The reversing system 11 includes two reversing machines 15, 17 Nos. 1 and 2 respectively, which are shown and described more particularly hereinafter.

FIG. 1 also shows an arrangement of coke oven chambers in the battery 13, there being 1, 2, 3 . . . N oven chambers. Oven chamber No. 1 and oven chamber No. N are end ovens.

As shown in FIG. 1, the reversing machine No. 2 actuates rods 19 that are connected to lean or blast furnace gas valves. Also reversing machine No. 2 actuates rods 21 that are connected to air and flapper valves.

Reversing machine No. 1, in like manner, actuates rods 23 connected to air and waste-heat valves, and rods 25 connected to rich or coke oven gas valves.

Those skilled in the art will recognize that the several actuator rods 19, 21, 23, 25 include conventional flexible portions, such as chains, that loop around and coact with sheaves or sprockets at the corners, as suggested by the reference numeral 27.

Figure 2:
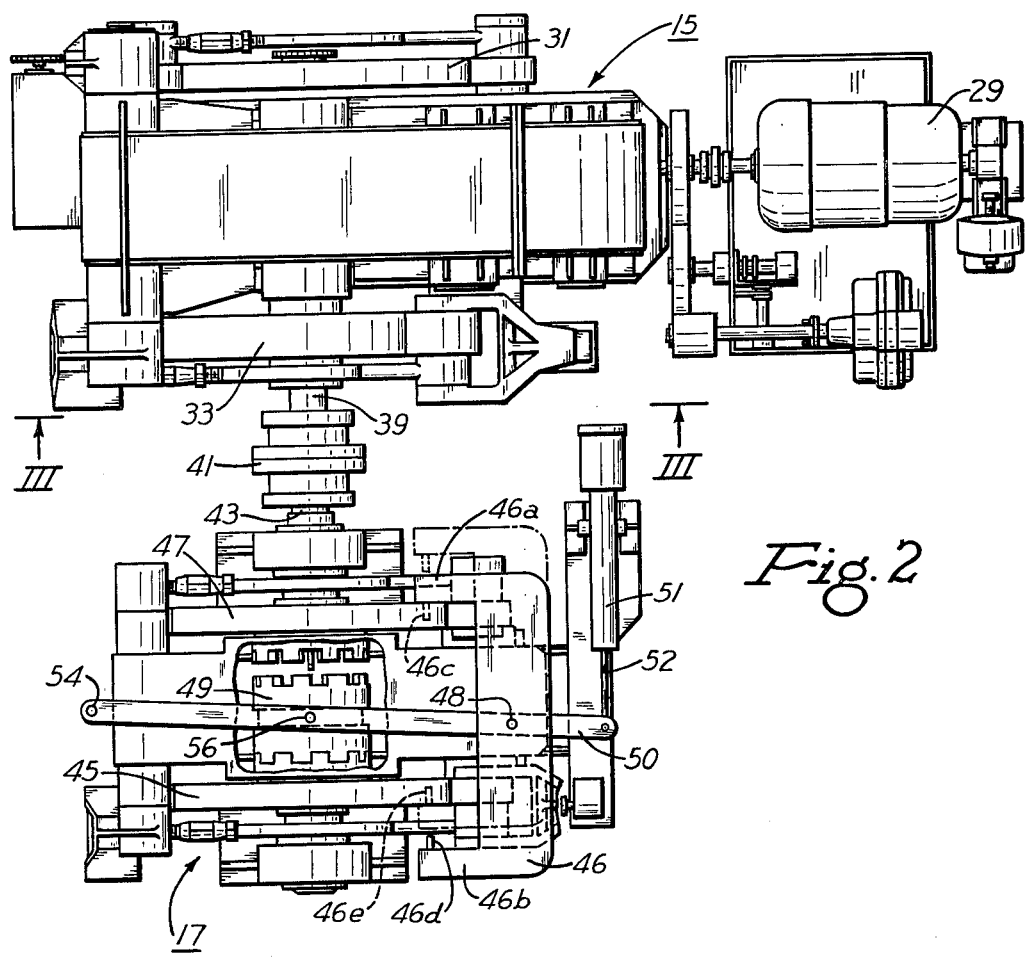
FIG. 2 is a schematic plan view of a reversing machine in accordance with the invention that is included in the system of FIG. 1.
Figure 3:
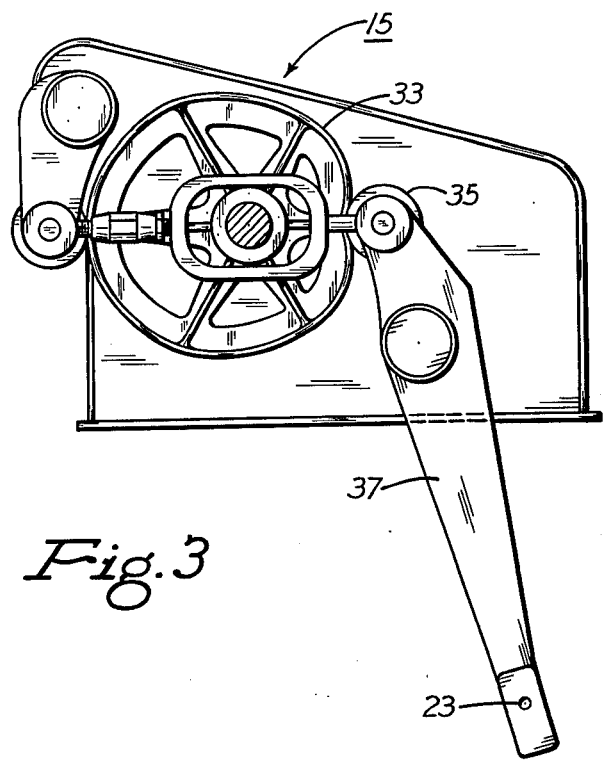
FIG. 3 is a view along line III—III of FIG. 2.

Reversing machine No. 1, shown in FIG. 2, includes an electric motor 29 as a source of power that rotatively drives a fuel gas cam 31 on one side and an air and waste-heat cam 33 on the other side. As shown in FIG. 3, the air and waste-heat cam 33 coacts with a cam follower 35 on one end of a cam lever 37. The other end of the cam lever 37 connects to the actuating rod 23. Likewise, though not shown, the fuel gas cam 31 coacts with a cam follower on one end of a cam lever that is connected to the actuating rod 25.

As shown in FIG. 2, the No. 1 reversing machine 15 has a cam shaft 39 that is coupled, as at 41, to a cam shaft 43 of the No. 2 reversing machine 17. The No. 2 reversing machine 17 also is provided with a lean or blast furnace gas cam 45 on one side, and an air valve cam 47 on the other side. While not shown, the blast furnace gas cam 45 and the air flapper valve cam 47 each coact with a cam follower and lever arrangement, like that shown in FIG. 3, for actuating the blast furnace gas rod 19 and the air valve rod 21 respectively.

Reversing machine No. 2, designated by reference numeral 17, includes a jaw clutch 49 that is shown in one position engaging the blast furnace gas cam 45 for rotation about its axis. The jaw clutch 49 has different sized jaws that coact with corresponding different sized jaws on the cams. Thus, the jaws can interengage in only one position. This is essential so that shifting can take place only at the machine neutral position and in no other position. As shown, a slidable plate 46 is pin connected at 48 to an actuating lever 50 that is pivotally connected at one end to piston rod 52 of the actuator cylinder 51 and is pivotally secured at the other end to an anchor point on the No. 2 reversing machine, as at 54. The actuating lever 50 is also pivotally connected to the clutch 49, as at 56.

The slidable plate 46 has outwardly projecting arms 46a, 46b, as shown, each of which carries a pin 46c, 46d. The pin 46c is cooperative with a pin socket (not designated) in the air flapper valve cam 47, while the pin 46d is spaced from a pin socket 46e in the blast furnace gas cam 45.

Operatively the pins 46c and 46d are locking pins that cooperate with pin sockets, like 46e, in the cams 45, 47 to prevent the one cam, either 45 or 47, that is not operative at the particular time in the heating cycle, from turning.

FIG. 4 and FIG. 5 illustrate respectively a plan view of a gas or air and waste-heat reversing box 53, and a view along line V—V of FIG. 4. As shown in a breakaway portion of FIG. 4, there are a plurality of removable finger bars 55a, 55b, 55c of different widths in the gas inlet to the box 53. The box 53 has two pivotally mounted lids 57, 59 that operate simultaneously when a reversing lever 61 is pivoted about the axis of a shaft 63. The lever 61, as shown in the solid outline, is in a neutral position. In the position marked 61a, the air lids 57, 59 are open, and, in the position marked 61b, the air lids 57, 59 are closed.

It will be noted that a quadrant gear 65 is fixed to the shaft 63 and coacts with a smaller quadrant gear 67 fixed to another shaft 69. A short lever 71 is linked to another lever 73 that turns shaft 75 and opens and closes lid 59 simultaneously with lid 57.

As shown in FIG. 4, another lever 77 is pivotally mounted and opens and closes, by means of operating shafts 79, 81 and chains 83, 85 looped over quadrants 87, 89, waste heat valves (not shown) within the waste heat box 53.

FIG. 6 illustrates a double blast furnace gas reversing box 91 that includes a double blast furnace gas reversing box body portion 93, two gas shut-off valve assembly units 95, 97 and a butterfly valve 99, 101 that connect the valve assembly units 95, 97 to the gas reversing box 93.

Within each valve assembly unit 95, 97 there is a gas shut-off valve 103 (only valve 103 is shown), and each such valve is mounted to one end of a lever 107 that is fixed to and is pivotable with a respective shaft 111, 113; the shafts being journaled in the valve assembly units 95, 97.

An arm 115, 117 is fixed to each shaft 111, 113, and is connected to one end of a connecting rod 119, 121. As shown in FIG. 6, the end of the connecting rods 119, 121 are resiliently biased by springs 123, 125 to the arms 115, 117.

The connecting rods 119, 121 are connected to levers 127, 129 that are fixedly secured to shafts 131, 133. The shafts 131, 133 are mounted to the top of the double blast furnace gas reversing box and the shaft 131 is connected to a gas-disc operating lever 135. The shafts 131, 133 have interengaging gears 137, 130 whereby, when the lever 135 is pivoted, both gas discs (not shown) within the reversing box body portion open and close simultaneously, and both gas shut-off valves, like valve 103, also open and close simultaneously; the internal valves being opened and closed when the conventional quadrants 110 rotate. Chains 112 loop around the quadrants 110 and connect to valve stems 114.

As shown in FIG. 6, the shafts 111, 113 are also provided with another clamping lever 141, 143 which can be used to secure, by means of the eyebolt and wing nut assembly 145, 147, the mushroom valves, like valve 103, in the closed position.

FIGS. 7–11 illustrate an air and waste heat reversing box assembly 149 with portions thereof shown in section. FIG. 7 is a plan view of the top of the reversing box 149, and it shows two air box lids 151, 153, with the lid 151 in the open position and with the lid 153 in the closed position. The air box lids are operatively pivoted by air lid levers 155, 157, secured to operating shafts 159, 161.

Secured to shaft 161 is an operating lever 163 which is also connected operatively to shaft 159, for simultaneous rotation thereof, by means of the interconnected links 165, 167. As shown in FIG. 11, arms 169 and 171 are secured respectively to shafts 159 and 161, and links 173, 175 connect the arms 169, 171 to other arms 177, 179 that are secured to shafts 181, 183.

Quadrants 185, 185a are secured to shaft 181 and quadrants 187, 187a are secured to shaft 183. Connected operatively to each quadrant 185 and 185a are chains 189, 189a that are secured to valve stems. Valve stem 191 is shown in FIG. 11 and a similar valve stem (not shown) is connected to chain 189a. Likewise, quadrants 187, 187a and chains 193, 193a are secured to valve stems, but only valve stem 195, connected to chain 193, is shown in FIG. 11, though a similar valve stem is connected to chain 193a.

Figure 8:
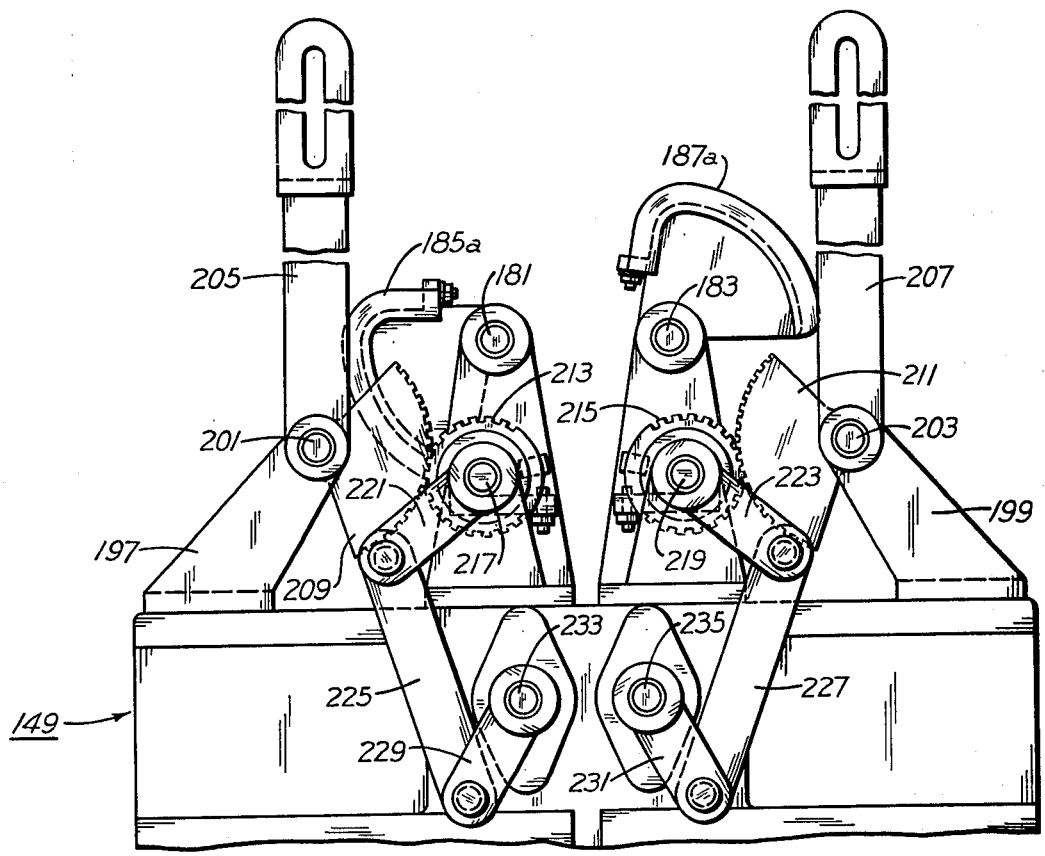
FIG. 8 is a view along line VIII—VIII of FIG. 7.

FIG. 8 illustrates supports 197, 199 mounted to the top of the reversing box assembly 149, and in each support there is journaled a shaft 201, 203. A lever 205, 207 is secured to each shaft 201, 203, and a gear segment 209, 211 is also secured to each shaft 201, 203.

Each gear segment 209, 211 coacts with another gear member 213, 215 secured to shafts 217, 219. Secured to shafts 217, 219 are arms 221, 223 that are pin-connected to links 225, 227. The links 225, 227 are also pin-connected to arms 229, 231 which are secured to shafts 233, 235.

Figure 10:
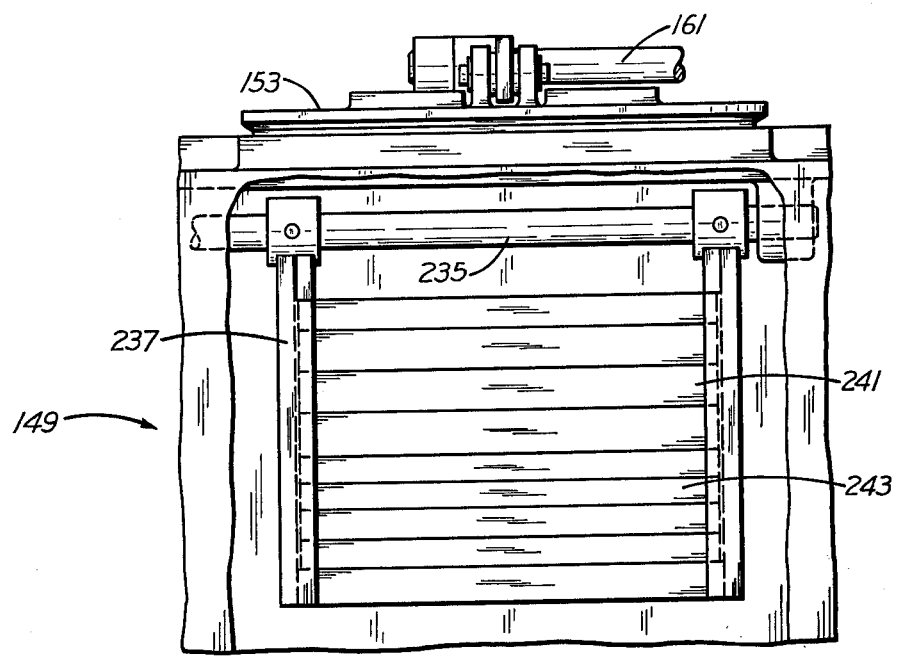
FIG. 10 is a view along line X—X of FIG. 9, showing a portion of the structure of FIG. 7.

The shafts 233, 235 extend into the reversing box assembly and, as shown in FIGS. 9 and 10, a flapper type valve 237 is secured to shaft 235. Another similar flapper type valve (not shown) is secured to shaft 233 on the other side of a central dividing wall 239 within the reversing box assembly 149.

As shown in FIG. 10, the flapper type valve 237 has a plurality of conventional finger bars 241, 243 of varying width. As shown in FIG. 7, there are a plurality of conventional finger bars 245, 247 and 249, 251 of varying width in the air openings in the reversing box assembly 149.

FIG. 12 is a typical reversing lever and blast furnace gas shut-off valve lever diagram showing various angular positions of the reversing lever and the relative respective positions of the blast furnace gas shut-off valves. The diagram of FIG. 12 is related to the structure shown and described in FIG. 6.

Referring to FIGS. 12 and 6, the valves 103 in FIG. 6 are shown in the open position. Then, referring to FIG. 12, lever 135, the links 127, 129; links 119, 121; and links 115, 117 are shown in their respective positions when the lever 135 is in position at A.

When the lever 135 is moved from position A to position B, the lever 135 is there designated as position 135a, and the valves 103 close and the blast furnace gas valve is in the neutral position. In such neutral position, links 127, 119 assume a straight line comprised on links 127a, 119a, and link 115a connects to shaft 111 as shown. Likewise, links 129, 121 assume the straight line attitude, with link 117a in the position shown. In position C, the lever 135 is designated as 135b and the gas valves 103 are partially open. In such position, links 127, 119 assume the positions 127b, 119b; the links 129, 121 assume the positions 129a, 121b, and the links 115, 117 assume the positions 115b, 117b.

A typical coke oven battery in which the reversing mechanism of the present invention is incorporated is designed for two types of gas firing: (1) rich (coke oven) gas only through an underjet system; and (2) blast furnace gas through sole flues simultaneously with lean (mixed) gas through the underjet system.

The automatic change over feature will allow the type of gas firing to be changed by running the reversing machine to the neutral position and depressing a push button in a control console (not shown).

The automatic change over features affect the design of the air, waste heat and blast furnace gas reversing boxes, the reversing machine, and the lean (mixed gas) system.

The air, waste heat, blast furnace gas reversing boxes are designed to maintain the normal reversing sequence of the air, waste heat and blast furnace gas flow. The operation, however, is divided and performed by three individual reversing rods. Conventionally, this is accomplished by one reversing rod.

The present invention accomplishes automatically the following operations which are accomplished manually in conventional reversing procedures: (a) engage or disengage blast furnace gas and air lid operation at all double regenerator boxes; (b) open or close the blast furnace gas shut-off valves; and (c) change the air setting on all single regenerator boxes.

The reversing machine shown and described herein controls the sequence of moving four reversing rods. For a given type of firing, three rods will operate while the fourth rod is locked out in its neutral position. A shifting (change over) device locks out one rod to its neutral position while engaging the other rod for operation.

In the lean (mixed gas) system, two butterfly-type shut-off valves are provided upstream of the fuel gas heater. One such valve is in the coke oven gas supply line, and one is in the mixed gas supply line. These valves are interconnected mechanically so that as one closes the other opens. The operation of these valves is interlocked with the shifting (change over) device on the reversing machine.

Thus, when the reversing machine shifting device is engaged for rich (coke oven) gas underfiring, the coke oven gas supply is automatically opened and the lean (mixed) gas valve is closed. Likewise, when the reversing machine shifting device is positioned for blast furnace gas (lean gas) firing, the lean (mixed) gas valve is opened and the coke oven gas valve is closed.

It should be noted that when a coke oven battery is equipped with a reversing system in accordance with the present invention, it is not possible at the same time to fire a portion of the battery on one type of gas, rich or lean, and the other portion on the other type of gas, lean or rich. The entire battery must be fired with the same type of gas. Also, it is possible to fire the battery with blast furnace gas only by manually closing all the emergency cocks on the basement fuel gas header.

The reversing machine is a gear-driven, cam-type machine driven by an electric motor and utilizes both mechanical and electrical interlocks. By selecting this arrangement the cam-type mechanism provides a mechanical interlock to maintain the proper sequence of rod movements.

The reverse cycle is initiated by an electric timer (not shown) activated from a control console located in a convenient location, that starts the drive motor 29. During the even-hour reverse, the motor runs clockwise, and at the end of the heating cycle, at the half-hour reverse, the motor stops and then runs counterclockwise. The motor speed is controlled so as to produce one revolution per minute speed of the cams 31, 33. A complete reverse requires 180° cam rotation. This is accomplished in 30 seconds time plus an adjustable neutral time delay period for a complete reverse.

A cam type limit switch driven by the output shaft of the cam stops the drive motor at neutral and at the end of the reverse cycle.

The reversing machines, Nos. 1 and 2, have two output cams each and each cam coacts with a cam follower on a pivotally mounted reversing lever. The four reversing levers are connected to the four reversing rod loops that travel through, typically, 30 inches of travel.

The four rod loops 19, 21, 23 and 25, being connected respectively to the valves shown in FIG. 1, control:

(a) The rich gas cocks in the basement. Cam 31 of reversing machine No. 1, operates fuel gas rod loop 25 on both types of firing;

(b) Cam 33 of reversing machine No. 1 operates the rod loop 23, and this rod loop, through levers on the valves, operates all of the waste heat discs and the air lids for the single regenerator boxes. Cam 33 operates the rod loop 23 on both types of firing;

(c) Cam 47 of reversing machine No. 2 operates the air lids on the double regenerator boxes and the air flapper valve inside the single regenerator boxes. Cam 47 can be locked out at the neutral position when firing with blast furnace gas, or it can be engaged to operate when firing with rich gas; and (d) Cam 45 of reversing machine No. 2 operates the blast furnace gas mushroom valves and the blast furnace gas shut-off valves. This cam 45 can be locked out at neutral position when firing rich gas, or it can be engaged to operate when firing with blast furnace gas.

The shifting or change-over mechanism comprises the jaw clutch which is driven by the electric motor through suitable conventional gear reducing apparatus. Working in conjunction with the jaw clutch is a set of locking pins. The mechanism is so arranged that, as the jaw clutch engages one cam, the locking pin for that cam is disengaged and the locking pin for the other cam is engaged.

The operation of the shifting or change-over mechanism is initiated by a push button on a control console located at a control center, and electrical interlocks lock out the drive motor during the change-over. Once the rotary actuator completes the shift or change-over, it automatically initiates the change-over of the lean (mixed gas) system. Limit switches are actuated at the extreme ends of travel and they are interlocked with the shifting actuator so that both must be in the proper position before the motor drive can operate.

Unique features of the present invention are:

1. The air lids on the double regenerator boxes must be closed and locked when firing lean blast furnace gas and must operate when firing rich gas. These lids are operated through the set of intermittant gearing. This type of gearing allows the driving gear to rotate through a portion of the rotation while the driven gear remains stationary. It also locks the driven gear in position during this period of rotation. This locking feature is used to secure the lids in the closed position when firing with lean gas.

Thus, when the air flapper valve rod is locked at the neutral position, the air lids are closed and locked. During the operation on rich gas, one-half of the rod movement opens or closes the lid by means of the gearing and the lid remains stationary through the other half of the rod movement.

Two shut-off valves are driven by a common drive mechanism and operated so that as one valve opens the other valve closes. These are operated at the same time the machine change-over is made. Thus, when the machine is shifted to lean gas firing, the mixed gas valve is opened to underfire the battery with mixed gas. When the machine is shifted to rich gas firing, the rich gas is opened to underfire the battery with rich gas.

Although the invention has been described herein with a certain degree of particularity it is understood that the present disclosure has been made only as an example and that the scope of the invention is defined by what is hereinafter claimed.

What is claimed is:

1. In combination, a coke oven battery and an apparatus for reversing the heating cycle of the coke oven battery, said apparatus comprising:

(a) a first reversing machine including a rotatable fuel gas cam and a rotatable air and waste heat cam;

(b) means for actuating said first reversing machine and rotating said cams;

(c) a second reversing machine including a rotatable blast furnace gas cam and a rotatable air and flapper cam;

(d) clutch means, forming a part of said second reversing machine, for selectively engaging and disengaging either said blast furnace gas cam or said air and flapper cam of said second reversing machine with said fuel gas cam and said air and waste heat cam of said first reversing machine;

(e) means for moving said clutch means into and out of selective engagement with either said blast furnace cam or said air and flapper cam;

(f) means for locking in a fixed position one of either of said blast furnace gas cam or said air and flapper cam as the other of these cams is driven by said clutch means engaged with said one cam and said rotating cams of said first reversing machine;

(g) a fuel gas rod coacting with said fuel gas cam;

(h) an air and waste heat rod coacting with said air and waste heat cam;

(i) a blast furnace gas rod coacting with said blast furnace gas cam;

(j) an air and flapper rod coacting with said air and flapper cam;

(k) a plurality of gas or air and waste heat reversing boxes, fixed to said coke oven battery, each including (1) a first shaft journaled to said box, (2) a second shaft journaled to said box, (3) a first lid pivotally secured to said second shaft, (4) a third shaft journaled to said box, (5) a second lid pivotally secured to said third shaft; (6) means interconnecting said second and said third shafts for the simultaneous rotation of said second and third shafts, (7) means integrating rotation of said first shaft with rotation of said second and third shafts, (8) a first lever fixed to said first shaft and connected to said air and flapper rod whereby linear movement of said air and flapper rod causes said first lever to pivot said first shaft which causes said second shaft and said third shaft to pivot simultaneously, said integrating means being so arranged that at one time during said heating cycle said lids are closed and said lids remain closed until said air and flapper rod is moved under the influence of said second reversing machine, (9) a pair of waste heat valves, (10) a pair of valve shafts pivotally mounting said waste heat valves to each said air and waste heat reversing box, (11) a second lever pivotally coacting with said pair of valve shafts and connected to said air and waste heat rod, whereby linear movement of said air and waste heat rod causes said second lever to pivot said valve shafts simultaneously to open said waste heat valves, said movement of said air and waste heat rod being coordinated by said clutch means of said second reversing machine with said movement of said air and flapper rod such that said waste heat valves are opened as said lids are closed and said waste heat valves are closed as said lids are opened when said coke oven is operating on rich fuel gas, and (12) means coacting with said lids to regulate air flow into said gas or air and waste heat reversing box;

(l) a plurality of blast furnace gas reversing boxes each flow coordinated to said gas or air and waste heat reversing box, each containing (1) a pair of shut-off valves, (2) an arm mounted to pivot each said shut-off valve, (3) a toggle linkage comprising a pair of links pivotally connected together to each one of said arms and respectively to a pair of shafts, journaled on said gas reversing box for rotation, (4) means on one shaft coacting with the other shaft for simultaneously rotating both shafts, (5) a lever pivotally fixed to one of said shafts and connected to said blast furnace gas rod whereby linear movement of said blast furnace gas rod causes said lever to pivot said pair of shafts to open and close said shut-off valves, said movement of said blast furnace gas rod being coordinated by said clutch means of said second reversing machine with said movement of said air and waste heat rod such that said lids on said air and waste heat reversing boxes are opened as said shut-off valves are opened and said lids on said air and waste heat reversing boxes are closed as said shut-off valves are closed when said coke oven is operating on blast furnace gas or a mixture of blast furnace and rich fuel gases, (6) a pair of internal valves coordinated to open and close with said shut-off valves, and (7) means for operating said internal valves cooperating with said pair of shafts;

(m) a plurality of air and waste heat reversing boxes, each fixed to said coke oven battery at a point between two of said plurality of said gas or air and waste heat boxes with corresponding said flow coordinated blast furnace gas reversing boxes such that said air and waste heat reversing boxes alternate with said gas or air and waste heat boxes with corresponding said flow coordinated blast furnace gas reversing boxes, each said air and waste heat reversing box including (1) a first lid, (2) a first shaft pivotally mounting said first lid to said air and waste heat reversing box, (3) a second lid, (4) a second shaft pivotally mounting said second lid to said air and waste heat reversing box, (5) connecting means between said first shaft and said second shaft which pivots said first lid open as said second lid is closed and pivots said first lid closed as said second lid opens, (6) a lever pivotally fixed to either said first shaft or said second shaft and connected to said air and waste heat rod whereby linear movement of said air and waste heat rod causes said lever to pivot said first shaft and said second shaft simultaneously such that either said first lid closes and said second lid opens or said first lid opens and said second lid closes, (7) a first pair of waste heat valves operably connected to said first shaft such that when said first lid is opened said first pair of waste heat valves is closed, and when said first lid is closed said first pair of waste heat valves is opened, (8) a second pair of waste heat valves operably connected to said second shaft such that when said second lid is opened said second pair of waste heat valves is closed and when said second lid is closed said second pair of waste heat valves is opened, (9) means coacting with said first lid and said second lid to regulate air flow into said air and waste heat reversing box, (10) a third shaft rotatably mounted to said air and waste heat reversing box, (11) a first flapper air adjusting valve pivotally mounted within said air and waste heat reversing box positioned adjacent to said first lid, (12) means interconnecting said third shaft and said first flapper by which said first flapper can be pivoted when said third shaft is rotated, (13) a fourth shaft rotatably mounted to said air and waste heat reversing box, (14) a second flapper air adjusting valve pivotally mounted within said air and waste heat reversing box positioned adjacent to said second lid, (15) means interconnecting said fourth shaft and said second flapper by which said second flapper can be pivoted when said fourth shaft is rotated, (16) a lever pivotally engaged with said third shaft and connected to said air and flapper valve rod such that linear movement of said air and flapper valve rod causes said first flapper to pivot, (17) a lever pivotally engaged with said fourth shaft and connected to said air and flapper valve rod such that linear movement of said air and flapper valve rod causes said first flapper to pivot, said levers engageably arranged with said third shaft and said fourth shaft such that said third shaft and said fourth shaft rotate simultaneously causing said first flapper to pivot from vertical to horizontal at the same time that said second flapper is caused to pivot from horizontal to vertical and causing said first flapper to pivot from horizontal to vertical at the same time that said second flapper is caused to pivot from vertical to horizontal, said horizontal positions of said flappers coordinated by said reversing machines to correspond to said open positions of said lids when said coke oven is being operated on rich fuel gas and said vertical positions of said flappers corresponding to said open position of said lids when said coke oven is being operated on blast furnace gas, said positions of said flappers being coordinated by said clutch means of said second reversing machine.

2. The invention of claim 1 wherein said means for locking includes a locking pin that cooperates with an aperture in said cam, said locking pin being maintained in a fixed position when it cooperates with said cam.

3. The invention of claim 1 wherein said integrating means comprises a quadrant gear on said first shaft meshing alternately with a guadrant gear on said second shaft and a quadrant gear on said third shaft.

4. The invention of claim 1 wherein said means interconnecting said second and said third shafts includes links secured to said shafts and to an interconnecting link.

5. The invention of claim 1 including means in said toggle linkage resiliently biasing one of said links with said lever.

6. The invention of claim 1 wherein said clutch means comprises:
   (a) a first jaw with slots of different sizes mounted operatively to said first reversing;
   (b) a second jaw with teeth of different sizes, mounted operatively to said second reversing machine, which match and coact with said slots of said first jaw;
   (c) means for interengaging said first jaw and said second jaw only operable when said second reversing machine is in a vertical position in said heating cycle of said battery.

7. The invention of claim 1 wherein said means for moving said clutch means includes a lever pivotally mounted to said second reversing machine and to said clutch means.

8. The invention of claim 7 including powered means connected to said lever for moving the same to bring said clutch means into and out of engagement.

9. The invention of claim 1 wherein said air and waste heat reversing boxes each includes:
   (a) at least one first means for adjusting orifices for air entering said box when a lid is raised and when said battery is fired using blast furnace gas; and
   (b) at least one second means for adjusting said orifices for air entering said box when said lid is raised and when said battery is fired using rich gas.

10. The invention of claim 9 wherein:
    (a) said one first means includes a plurality of finger bars removably positioned in said orifice, whereby, as the number of finger bars is increased or decreased, the area of said orifices for air entering said box is decreased or increased accordingly;
    (b) said one second means includes a plurality of finger bars removably positioned in said flapper valves whereby as the number of such bars is increased or decreased, the effect of said flapper valves is to decrease or increase the amount of air passing through said flapper valves and said orifices into said box.

* * * * *